United States Patent
Brown et al.

[15] 3,698,797
[45] Oct. 17, 1972

[54] LASER OUTPUT ATTENUATOR

[72] Inventors: Ray B. Brown, Upper Marlboro; Frederick R. Fluhr, Oxon Hill, both of Md.; George L. Hall, Washington, D.C.

[73] Assignee: The United States of America as represented by the Secretary of the Navy

[22] Filed: April 27, 1970

[21] Appl. No.: 31,894

[52] U.S. Cl. ................................... 350/266
[51] Int. Cl. .................................. G02f 1/30
[58] Field of Search......350/266, 269, 272, 102, 103; 331/94.5

[56] References Cited

UNITED STATES PATENTS

| | | |
|---|---|---|
| 2,929,922 | 3/1960 | Schawlow et al. .........331/94.5 |
| 2,280,993 | 4/1942 | Baruer........................356/103 |
| 3,185,021 | 5/1965 | Thompson..................356/100 |
| 3,286,193 | 11/1966 | Koester et al.............331/94.5 |

*Primary Examiner*—Ronald L. Wibert
*Assistant Examiner*—Orville B. Chew, II
*Attorney*—R. S. Sciascia, Arthur L. Branning, J. G. Murray and M. L. Crane

[57] ABSTRACT

This disclosure is directed to a wide range laser power attenuator which uses suitable optical lenses in combination with a pinhole and suitable absorption baffles to control a laser beam as desired. The system operates without causing any degradation of coherence and polarization properties of the laser beam.

4 Claims, 2 Drawing Figures

PATENTED OCT 17 1972 3,698,797

INVENTORS
RAY B. BROWN
FREDERICK R. FLUHR
GEORGE L. HALL
BY [signature] AGENT
[signature] ATTORNEY

LASER OUTPUT ATTENUATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, different types of attenuators have been used such as multi-plate reflectors and neutral density filters. Such attenuators cannot handle high power and they contribute to the degradation of the laser beam coherence and polarization. Also prior art devices are not readily available in the middle infrared range and usually are extremely expensive.

SUMMARY OF THE INVENTION

This invention is directed to a wide range laser power attenuator which contains a pinhole-power absorber-reimaging lens assembly which is adjustable to provide a simple relatively inexpensive attenuator. The system is operative over a wide range of power without degrading the laser beam coherence nor affecting the polarization of the beam.

STATEMENT OF THE OBJECTS

It is therefore an object of the present invention to provide an inexpensive, relatively simple attenuator for operation over a wide range of laser power.

Another object is to provide an attenuator that does not degrade laser beam coherence nor affect polarization of the beam.

Still another object is to provide an attenuator which may be easily adjustable for different power levels.

Other and more specific objects of this invention will become apparent upon a careful consideration of the following specification and drawings.

DESCRIPTION OF THE INVENTION

Figure 1:
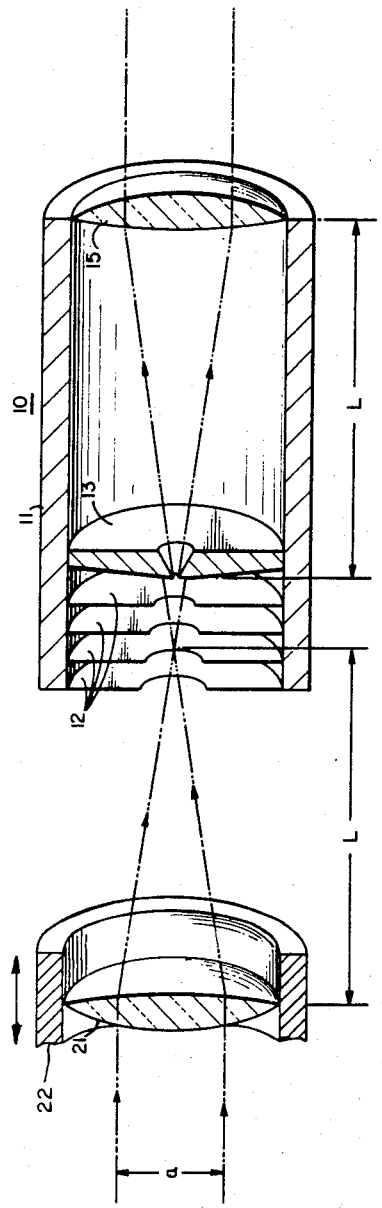
FIG. 1 is a perspective view of a cut-away of the device.
Figure 2:
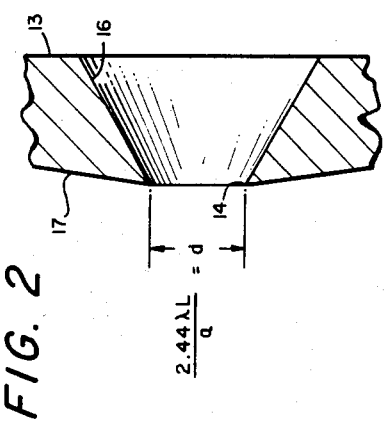
FIG. 2 is an enlarged cross sectional view of the pinhole shown in FIG. 1.

Now referring to the drawing, there is shown for illustrative purposes an attenuator made in accordance with the teaching of this invention. A detailed mathematical explanation of the device is included in an NRL Report number 7197 entitled "Variable Laser Attenuator Suitable for High Power Use" by R. B. Brown. As shown, the attenuator 10 includes an elongated housing 11 of any suitable shape such as a cylinder. The housing includes therein a plurality of axially spaced baffles 12, a partition 13 within the housing that includes a pinhole 14 on the axis of the housing and a reimaging lens 15 at one end of the housing. The baffles include axially aligned apertures therein wherein the apertures are of increasing diameter outwardly from the partition including the pinhole. The pinhole is of a particular diameter on the input side and may be conical shape 16 with the larger dimension of the cone on the output side. The input surface 17 of the pinhole partition is on an angle relative to the axis and is made highly reflective for reflecting light back toward the baffles for absorption. The lense 15 at the output end is positioned at a distance equal to its focal length from the input side of the pinhole. For a collimated input and output through the attenuator, the focal length of lens 15 is equal to that of focusing lens 21 which is secured in place by any desired structure 22. Lense 21 focuses the light from a laser into the baffle section towards the pinhole. As such, the reimaging lens 15 may be adjustable axially within the housing to any desired position such that the beam may exit in a manner other than collimated. Lenses of differing focal lengths may be used if equal diameter collimated input/output beams are not desired.

The housing, baffles, and pinhole partition are made of heat conductive material to dissipate as much heat as possible. As such, the partition and baffles could be made to include passages through which a coolant flows.

The pinhole edge structure, which is for the purpose of restricting the passage of light, should be made as thin as possible; however, in order to dissipate the heat, caused by the radiation incident thereon, it should be tapered from the very thin pinhole edge, thus, necessitating making the conical shaped passage therein to permit divergence of the light that passes through the pinhole. The pinhole is made of a particular size depending on the diameter of the laser beam being attenuated, the wavelength, and the focal length of the lens that focuses the light beam into the attenuator. The diameter, d, of the pinhole may be determined by the formula $(2.44\, L\lambda/a) = d$, where $\lambda$ is the wavelength of the light to be attenuated;

$L$ is the focal length of the lens that focuses the light into the attenuator; and $a$ is the diameter of the light beam.

In use of the attenuator unit for attenuation of a laser beam, a focusing lens is positioned on the inlet side of the attenuator in axial alignment therewith such that incident laser light will be focused onto the axis of the attenuator in front of the pinhole. Thus, the light directed toward the pinhole will be of a larger diameter than the pinhole wherein some of the light will pass through the pinhole and some will be reflected by the reflective surface. The pinhole acts as a diffraction limited source for the output reimaging lens. Therefore, the light that passes through the pinhole will be diverging toward the reimaging lens and on passing through the lens will exit as a collimated beam. Since the reimaging lens is placed a distance from the pinhole equal to the focal length of the focusing lens, the diameter of the light beam emerging from the reimaging lens will be equal to that of the light beam incident on the focusing lens. The light reflected back by the pinhole structure will be absorbed by the baffles. If the reflective surface of the pinhole structure is made normal to the axis, the light will not be readily or adequately trapped and some energy may be reflected back into the laser. Therefore, it is preferred that the reflective surface surrounding the pinhole be at an angle relative to the axis such that the light reflected by the surface diverges from the axis and not back into the laser.

The pinhole attenuator is made such that the attenuator assembly may be moved in an axial direction. Therefore, the focused light beam may be focused to a point at any desired place on the axis from the center of the pinhole to any workable distance in front of the pinhole. However, when the light is focused at the annulus of the pinhole no power will be intercepted and as the focal point is moved away from the pinhole, more power will be intercepted. An important consideration for operation of the attenuator is that the pinhole assembly be operated in the diverging cone of light beyond the focus to minimize back reflection into the source and to make it easier to collect and dissipate the high power rejected light. The rejected light is divergent and collected by the baffles in front of the pinhole.

An attenuator such as described above can be operated at any frequency to control up to 100 watts or more of power. Transmission is a smoothly decreasing function and attenuation of more than 30 db is possible. The attenuator is based upon the concept of a pinhole spatial frequency filter which permits the collimated laser output beam to be diffraction-limited and to have any desired diameter. The laser output from the reimaging lens may be directed onto any desired system with the desired attenuation.

As shown, the pinhole and reimaging lens moves as a unit; therefore, the pinhole is diffraction limited. If it is desired to reimage the focal point of the focusing lens, then the pinhole must be moved relative to the two lenses which will remain a fixed distance apart. The output beam will vary in diameter using this configuration.

Obviously many modifications and variations of the present invention are possible in the light of the above teachings. It is therefore to be understood that with the scope of the appended claims the invention may be practiced otherwise than as specifically described.

What is claimed and desired to be secured by Letters Patent of the United States is:

1. An attenuator for attenuation of a beam of laser radiation which comprises;

a housing having an input side and an output side, a pinhole assembly made of heat conductive material within said housing including a pinhole on the axis thereof, a beam focusing lens secured on the input side of said housing, a plurality of spaced baffles secured within said housing on the input side thereof between said beam focusing lens and said pinhole assembly, each of said baffles having an axial passage of a different diameter of diminishing scope toward said pinhole assembly for passing light therethrough to said pinhole, said pinhole assembly having a reflective surface on the input side thereof with the reflective surface at an angle with respect to the axis of said housing, said pinhole in said pinhole assembly is of a specific diameter on the input side with the output side having the shape of a cone with its apex toward the input side, and a reimaging lens fixed at a distance equal to its focal length from the input side of said pinhole assembly for reimaging the light that passes through said pinhole.

2. An attenuator as claimed in claim 1; wherein, the diameter $d$, of said pinhole is determined by the formula $2.44\lambda L/a$ where $\lambda$ = wavelength of laser light being attenuated,
$L$ = focal length of said focusing lens, and
$a$ = diameter of the laser beam being attenuated.

3. An attenuator as claimed in claim 1; wherein, the focal length of said focusing lens is equal to the focal length of said reimaging lens.

4. An attenuator as claimed in claim 3; wherein, said pinhole assembly is movable relative to said focusing lens.

* * * * *